United States Patent [19]

Rakhit

[11] Patent Number: 4,690,009

[45] Date of Patent: Sep. 1, 1987

[54] METHOD AND APPARATUS FOR PRODUCING PSEUDO - HERRINGBONE-TYPE GEARS AND GEAR PRODUCED THEREBY

[75] Inventor: Ajit K. Rakhit, Greer, S.C.

[73] Assignee: Reliance Electric Company, Greenville, S.C.

[21] Appl. No.: 802,963

[22] Filed: Nov. 29, 1985

[51] Int. Cl.$^4$ ............................................. F16H 55/18
[52] U.S. Cl. ....................................... 74/409; 74/439; 29/159.2
[58] Field of Search ................ 74/410, 409, 439, 440, 74/460, 458; 29/159.2, 447, 159 R

[56] References Cited

U.S. PATENT DOCUMENTS

| | | | |
|---|---|---|---|
| 2,393,098 | 1/1946 | Freeman | 29/159.2 |
| 2,397,777 | 4/1946 | Colman | 74/409 |
| 2,748,618 | 6/1956 | Lee | 74/439 |
| 3,355,789 | 12/1967 | Tetsull | 29/159.2 |
| 3,531,976 | 10/1970 | Fuhrman | 29/159.2 |
| 3,729,967 | 5/1973 | Bauknecht et al. | 29/159.2 |
| 4,036,074 | 7/1977 | Bodnar | 74/440 |
| 4,132,098 | 1/1979 | Culver et al. | 29/159.2 |
| 4,187,735 | 2/1980 | Terry | 74/410 |
| 4,342,548 | 8/1982 | Zimmern | 74/458 |
| 4,462,148 | 7/1984 | Joyce | 29/447 |
| 4,512,694 | 4/1985 | Foran et al. | 29/159.2 |

Primary Examiner—Cornelius J. Husar
Assistant Examiner—Peter M. Cuomo
Attorney, Agent, or Firm—Dority & Manning

[57] ABSTRACT

A method and apparatus for creating a matched set of pseudo herringbone-type gears from ordinary helical gears. Two cooperating shafts are provided with two helical gears on each which, when placed on the shaft, are oppositely angled with respect to one another, and which when combined together, herringbone gear profiles. The two cooperating shafts are held in a helical gear matching fixture which allows precise alignment of the helical gears in the creation of a matched pair of herringbone gears.

24 Claims, 2 Drawing Figures

METHOD AND APPARATUS FOR PRODUCING PSEUDO - HERRINGBONE-TYPE GEARS AND GEAR PRODUCED THEREBY

BACKGROUND OF THE INVENTION

This invention relates to a method and an apparatus for creating pseudo-herringbone-type gears from ordinary helical gears, and to gears produced thereby, particularly in matched pairs.

In comparing common types of power transmission gears, a helical gear which has angled teeth, typically has a higher load carrying capacity than the common spur gear, which has straight-cut teeth, of the same size. Also, because the helical gear runs more smoothly than the correspondingly spur gear, helical gears can normally operate at much higher speeds than can spur gears. However, in operation helical gears also create an axial thrust which may have to be absorbed by the bearings if same are employed to carry the gear. Relatively expensive bearings such as thrust bearings are normally employed to absorb such axial forces.

The advantages of a helical gear can be obtained, without the requirement of thrust bearings, however, through use of a herringbone gear. A herringbone gear is constructed of two adjacent rows of helical or angled gear teeth which extend around the circumference of the gear with the two rows of teeth being oppositely angled. By providing the two rows of oppositely angled gear teeth, axial forces normally created by a helical gear, are avoided. Any axial thrust created by one row of angled teeth is cancelled by the opposite acting reaction axial thrust created by the other row of angled teeth. Overall, herringbone gears possess advantages over other gear types in that (1) there is a continuous smooth meshing of gear teeth; (2) they afford greater strength; (3) there is the absence of end or axial thrust as noted above; (4) they may be operated at high peripheral speeds; and (5) they possess the the ability to withstand shock loads and loads of a vibrating nature because of very low backlash.

Herringbone gears, however, are difficult and costly to manufacture, requiring complex machine tools for manufacture. Consequently, the cost of herringbone gears is quite high. Additionally, conventional herringbone gears cannot be fully heat treated due to a lack of any equipment for finishing same after a heat treatment step. In fact, though herringbone gears are often preferred for certain mechanical environs, the cost for same has historically been prohibitive, and lesser desirable substitute gears have been employed in lieu of same.

An alternative approach to the true herringbone gear is a pseudo herringbone gear. Pseudo herringbone gears are generally known in the prior art, and conventionally include a two oppositely angled helical gears coupled together to form a composite gear. Such pseudo herringbone gears are, for example, disclosed in U.S. Pats. Nos. 4,429,586; 1,070,589; 1,320,459; 1,394,080; 1,464,108; 1,551,844; 3,545,296; 3,686,968; 3,307,433; 3,486,394; 2,982,144; 2,703,021; 3,160,026; 3,102,433; 2,734,396 and 4,022,083. Methods disclosed in the above listed patents for production of pseudo herringbone gears are relatively complicated and do not generally allow for use of off-the-shelf gears.

The present invention is directed to pseudo herringbone gears and affords the possibility of use of conventional off-the-shelf helical gears for the production of pseudo herringbone gears, particularly in matched pairs. Neither the apparatus nor the method of the present invention for producing pseudo herringbone gears, nor the particular gears per se is taught or suggested by the above listed patents, nor any other known prior art.

SUMMARY OF THE INVENTION

It is an object of the present invention to provide an improved pseudo herringbone gear.

Another object of the present invention is to provide an improved method of producing pseudo herringbone gears.

Yet another object of the present invention is to provide an improved method for producing a matched pair of herringbone gears from helical gears.

Still further, another object of the present invention is to provide improved apparatus for producing pseudo herringbone gears.

Another object of the present invention is to provide apparatus for producing a matched pair of pseudo herringbone gears from conventional helical gears.

Generally speaking pseudo herringbone gears according to the present invention comprise a shaft, a first helical gear secured about said shaft, said first gear having a pin dimension having no more than about 0.001 inch deviation from theoretical, and a further helical gear secured about said shaft, said further helical gear having opposite angled teeth to said first helical gear and the pin dimension of same having no more than about a 0.001 inch deviation from theoretical, and a spacer means located about said shaft between said first and further gears, and having an outer periphery located inwardly of the teeth on said gears.

Generally speaking, apparatus according to the present invention for producing pseudo herringbone gears comprises a base; first chuck means received on said base, said first chuck means defining a shaft receiving bore therein; second chuck means received on said base, said second chuck means defining a shaft receiving bore therein in a plane parallel to said bore opening in said first chuck means, at least one of said first and second chuck means being adapted for relative movement with respect to said other of said chuck means, and means to locate said first and second chuck means at a predetermined spacing therebetween, whereby a shaft may be received in each bore opening and helical gears may be secured thereto in meshing cooperation.

A helical gear-matching fixture is thus provided which preferably includes a base portion, a first stationary chuck means, and a second movable chuck means. One shaft is insertable into the stationary chuck means, and a second shaft is insertable into the movable chuck means. Two oppositely angled helical gears are placed on each shaft, one at a time, according to the method discussed below. The movable chuck means may be moved with respect to the stationary chuck means to properly mesh the helical gears received thereon.

In a most preferred arrangement, the second chuck means is received for movement along a track means, preferably a pair of rails and is equipped with locking means to secure against movement of the second chuck means when the locking means are engaged. The second chuck means may thus be moved forward and away from the stationary chuck means to accommodate manufacture of each matched gear set. Spring means may also be secured between the chuck means to bias said second chuck means toward said first chuck means to hold gears thereon in meshing relation.

The method of producing pseudo herringbone gears according to the present invention comprises the steps of providing first and second opposite angled meshable helical gears whose pin dimensions are within a same predetermined tolerance; securing said first helical gear about a first shaft and supporting said shaft in a predetermined disposition; supporting a second shaft in said predetermined disposition; and securing said second helical gear on said second shaft such that said first and second gears may be brought into meshing engagement; moving said first and second helical gears into meshing engagement without backlash; providing third and fourth oppositely angled helical gears whose pin dimensions are within a same predetermied tolerance and whose combined pin dimension in mesh without backlash is greater than a like combined pin dimension of said first and second gears, said third helical gear being oppositely angled with respect to said first gear; securing said third gear about said first shaft juxtaposed to said first gear; heating said fourth gear to about 300° F. to about 350° F. and locating same about said second shaft juxtaposed to said second gear for meshable engagement with said third gear; and maintaining said third and fourth gears in meshing engagement without backlash while said fourth gear cools adequate to shrink fit onto said second shaft.

More particularly, according to the present invention, preferably gears for the four categories are sized according to pin dimensions, ensuring no more than about a plus or minus 0.001 inch deviation from theoretical is present for any of the gears in any of the group. Thereafter, one of the first gear unit group is selected along with one of the second gear unit group. The two selected gears are then held in mesh without backlash while the pin dimension across the two gears is measured. The first gear is secured to a first shaft and the shaft is supported, preferably for rotation, in a first chuck means. A second shaft is similarly supported in a second chuck means and said second gear is located thereabout in alignment with said first gear to mesh therewith. Thereafter, the first and second gears are brought into meshing engagement without backlash and held thereat. Preferably, the second chuck means is movable with respect to the first chuck means to accomplish the meshing engagement, and may be locked in place, or spring biased to achieve a gear meshing relationship.

Ones of the third and fourth oppositely angled helical gear groups are then selected such that when held in mesh without backlash, the pin dimension across the two is greater than the like combined pin dimension of the first and second gears. The third gear which is oppositely angled with respect to the first gear is secured about the first shaft juxtaposed to the first gear. Thereafter, the fourth gear is heated to about 300° F. to about 350° F. and is located about the second shaft and brought into mesh with the third gear. The assembly is then held in mesh until the fourth gear cools down to approximately ambient temperature where it becomes shrunk-fit about the second shaft.

After production of the pseudo herringbone gears as noted above, the pair of gears is matched and is removed from the assembly and maintained together as a matched pair for subsequent use.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
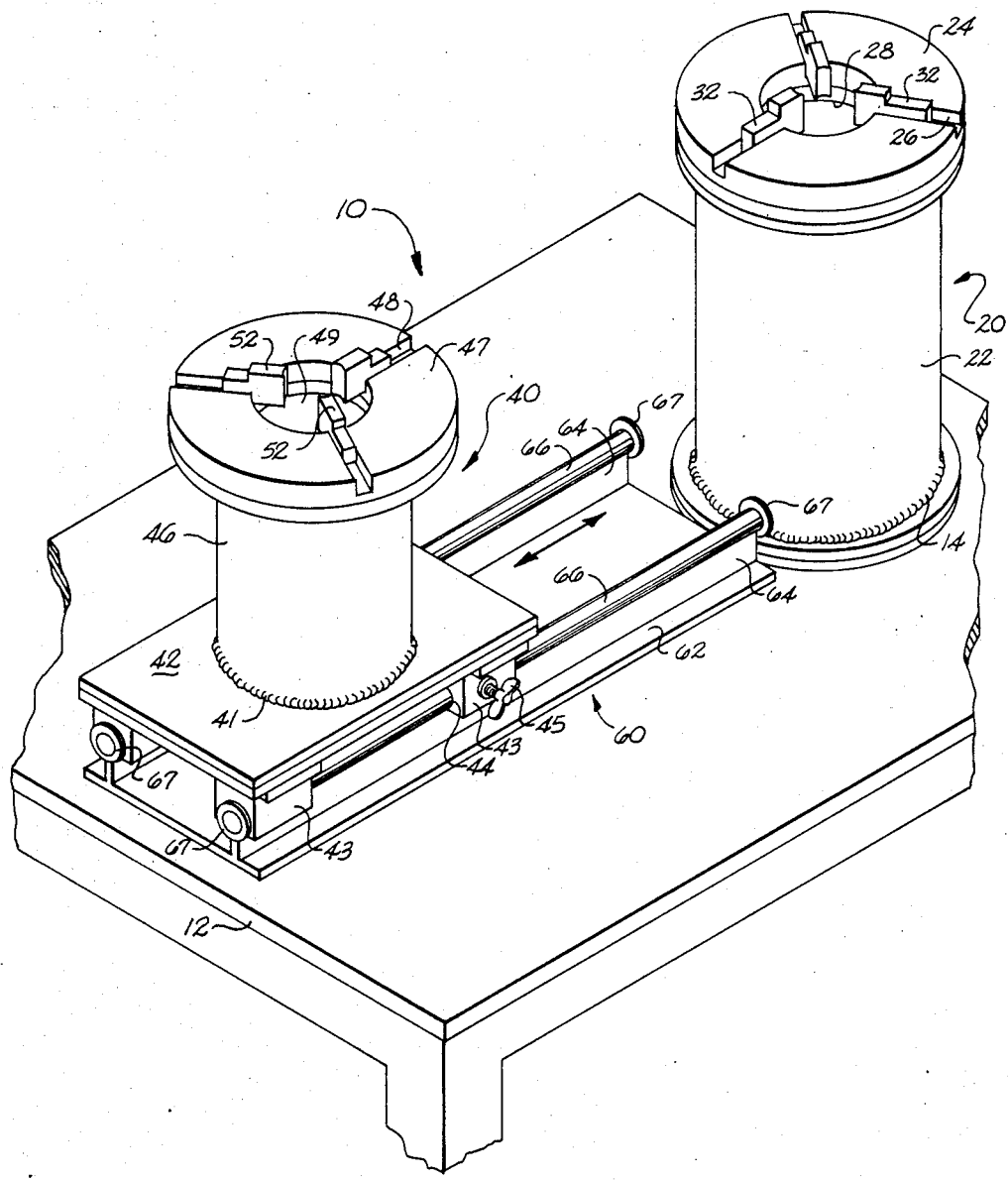
FIG. 1 is a perspective view of a helical gear matching fixture constructed in accordance with teachings of a preferred embodiment of the present invention.
Figure 2:
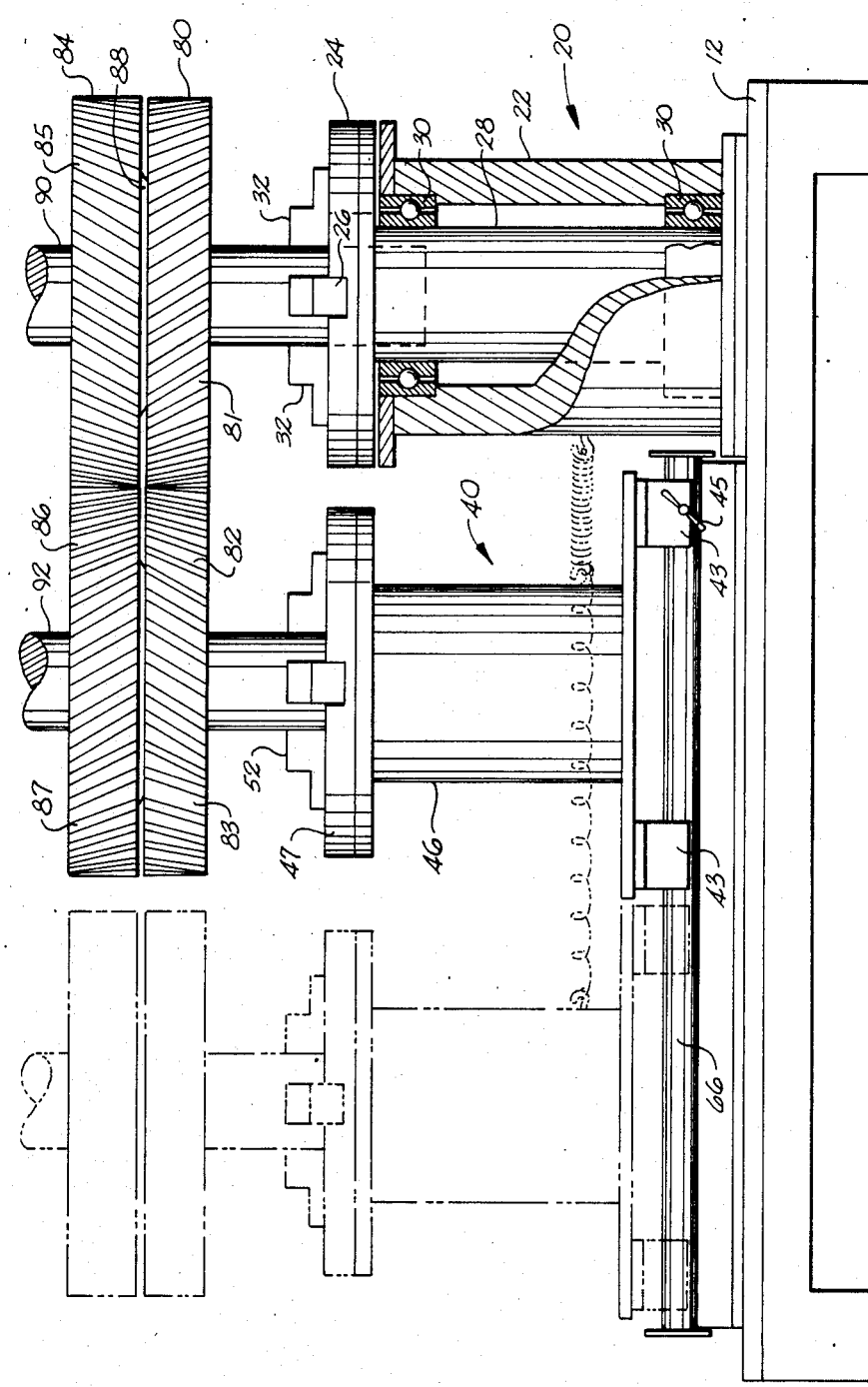
FIG. 2 is a side elevational view of a helical gear matching fixture as illustrated in FIG. 1 having a pseudo herringbone gear received thereon.

Referring now to the Figures, preferred embodiments of the present invention will be described in detail. A gear fixture generally 10 is illustrated in FIGS. 1 and 2 which is utilized for the production of pseudo herringbone gears according to the present invention. Fixture 10 includes a base 12 on which is located a first chuck means generally 20, and a second chuck means generally 40. Preferably, as illustrated, first chuck means 20 includes a cylindrical housing 22 which is secured to base 12 as by weldment 14, and with a generally planar top 24 which defines a plurality of slots 26 therein. Cylindrical housing 22 defines an internal bore 28 therein with a plurality of bearing assemblies 30 received along bore 28 (See FIG. 2). Adjustment means 32 are receivable in slots 26 and are movable therein with respect to bore 28 to permit accommodation of shafts of various diameters. Though not shown, adjustment means 32 are provided with some means, such as set screws, to lock same in place about a shaft received in bore 28.

Second chuck means 40, as illustrated in FIGS. 1 and 2, is movable toward and away from first chuck means 20. Particularly, second chuck means 40 is located on a track means generally 60 secured to base 12. Track means 60 includes a plate 62 secured to base 12 with spaced-apart standards 64 secured to plate 62 and extending upwardly therefrom. A cylindrical rail 66 is secured to an upper end of each standard 64 with stops 67 located at opposite ends of same.

Second chuck means 40 is secured as by a weldment 41 to a chuck plate 42 having legs 43 depending therefrom. Each leg 43 defines an opening 44 which is located about a rail 66 of track means 60 for movement therealong. In a preferred embodiment, openings 44 are lined with a low friction material such as an ultrahigh molecular weight polyethylene, or a tetrafluoroethylene material to improve sliding characteristics. Also, as illustrated particularly in FIG. 1, a locking means 45, illustrated as a thumb nut, is provided on one or more of legs 43 for locking engagement with rail 66 to secure chuck means 40 against movement. Alternatively, as illustrated in phantom in FIG. 2, a spring means generally 70 may be secured between chuck means 20 and 40. Spring means 70 is illustrated as a coil spring 72 secured between hook means 73 on chuck 20 and hook means 74 on chuck 40. Utilizing spring means 70, chuck means 20 and 40 may be moved apart for installation of a heated gear such as fourth gear 86. During cooling of the gear, the gear shrinks and opening means 70 will maintain continuous proper mesh of the gears during the cooling step.

Chuck means 40, like chuck means 20 preferably includes a cylindrical housing 46, a top 47 that defines a plurality of slots 48 and an internal bore 49. Adjustment means 52 are received in slots 48 for a purpose as explained with reference to first chuck means 20.

Helical gear producing fixture 10 as described above may be used in conjunction with the following method to provide a matched set of pseudo herringbone gears on two cooperating shafts.

In selecting helical gears for use according to the present invention, referring to FIG. 2, groups of first gears 80 (left hand teeth 81); second gears 82 (right hand teeth 83); third gears 84 (left hand teeth 85); and fourth gears 86 (right hand teeth 87) are preferably compiled, with each gear in each group having a measured pin dimension within a predetermined tolerance, preferably about 0.001 inch plus or minus deviation from theoretical. In determining pin dimension of a helical gear, a precision ground steel roll pin (not shown) of exact size is received in directly opposite teeth spaces for even numbered teeth or adjacent space for odd numbered teeth. The dimension is then measured over the two pins.

A first helical gear 80 and a second helical gear 82 are selected from respective groups of same and tightly meshed together. A combined pin dimension is taken across the the two gears. First helical gear 80 is then secured to a first shaft 90 by keying, shrink fitting or the like, and shaft 90 is inserted into bore 28 of stationary chuck means 20. Adjustment means 32 are then moved inwardly, if necessary, to center shaft 90 and locked in place.

A second shaft 92 is then inserted into bore 49 of movable chuck means 40 and appropriately centered, if necessary. Second gear 82 is then appropriately secured to second shaft 92 for meshing engagement with first gear 80. Second chuck means 40 is then moved along trackway 60 to bring second gear 82 into mesh with first gear 80 without backlash. Second shaft 92 may be rotated, if needed, for meshing gears 80 and 82. When such point is reached, movable chuck means 40 is locked in place, such as by securement of lock nut 45 against rail 66, or held in proper position by spring means 70, if employed.

A third gear 84 and a fourth gear 86 are then selected from their respective lots to, when tightly meshed, provide a combined pin dimension across the two gears that is larger than a like combined pin dimension of first and second gears 80 and 82. The selected third gear 84 is then secured to first shaft 90 by keying, shrink fitting or the like juxtaposed to first gear 80. Note in FIG. 2 that a spacer means 88 is located between first gear 80 and third gear 84 which may be a separate element or of unitary construction with one of the gears. Spacer 88 preferably has a diameter slightly smaller than the root diameter of gears 80 and 84. The selected fourth gear 86 is then heated to a temperature adequate to achieve a heat shrink fit about shaft 92, preferably to a temperature of about 300° F. to about 350° F. Gear 86 is then located about shaft 92 juxtaposed to second gear 82 with a spacer means 88 therebetween, and brought into meshing engagement with third gear 84. Since the relative position of shafts 90 and 92 is selectively fixed at this point, it may be necessary to rotate first shaft 90 to achieve meshing engagement between gears 84 and 86. After gear 86 is properly located on shaft 92, juxtaposed to gear 82 and in meshing engagement with gear 84, the relative positions of shafts 90, 92 continues to be maintained until gear 86 cools adequately for a tight fit about shaft 92, preferably to about ambient temperature. As noted above if a spring means 70 is employed, continuous meshing will be achieved during shrinkage of gear 86 as it cools.

Shafts 90 and 92 with the respective gears noted above secured thereto, may then be removed from chucks 20, 40 and thereafter maintained as a matched pair of pseudo herringbone gears. The present invention thus enables one to produce a functional herringbone gear arrangement without the necessity of the expensive equipment heretofore required.

It will be understood, of course, that while the form of the invention herein shown and described constitutes a preferred embodiment of the invention, it is not intended to illustrate all possible forms of the invention. It will also be understood that the words used are words of description rather than of limitation, and that various changes may be made without departing from the spirit and scope of the invention herein disclosed.

What is claimed is:

1. Apparatus for production of a matched set of shaft-mounted pseudo herringbone gears from preformed helical gears, comprising:
    (a) a base;
    (b) first chuck means received on said base, said first chuck means defining a shaft receiving bore therein for receiving a first shaft having a first helical gear thereon;
    (c) second chuck means received on said base, said second chuck means defining a shaft receiving bore therein extending substantially parallel to said bore in said first chuck means for receiving a second shaft having a second helical gear thereon, at least one of said first and second chuck means being adapted for relative movement with respect to said other of said chuck means while maintaining said shaft receiving bore of said first chuck means substantially parallel to said shaft receiving bore of said second chuck means; and
    (d) locking means for locating and securing said first and second chuck means with a predetermined distance therebetween, whereby said first shaft may be received in said shaft receiving bore of said first chuck means and said second shaft may be received in said shaft receiving bore of said second chuck means with the first helical gear of said first shaft substantially meshing with the second helical gear of said second shaft, said first shaft and said second shaft being positioned such that a third helical gear may be provided said first shaft, and a fourth helical gear may be provided said second shaft for substantially meshing with said third helical gear, allowing said first and second helical gears to substantially mesh with one another and said third and fourth helical gears to substantially mesh with one another for producing a matched set of pseudo herringbone gears.

2. Apparatus as defined in claim 1 wherein said first chuck means is fixedly secured to said base and extends upwardly therefrom, and said second chuck means is movable toward and away from said first chuck means, and said locking means are associated with said second chuck means.

3. Apparatus as defined in claim 2 wherein track means are secured to said base adjacent said first chuck means, and wherein said second chuck means is received on said track means for movement therealong.

4. Apparatus as defined in claim 2 wherein said first chuck means supports said first shaft received in said receiving bore of said first chuck means for rotation.

5. Apparatus as defined in claim 4 wherein bearings are provided along said receiving bore of said first chuck means to rotatably support said first shaft therein.

6. Apparatus as defined in claim 3 wherein said trackway comprises a pair of spaced-apart rails and wherein said second chuck means further comprises a lower section adapted to be received on said rails for movement therealong.

7. Apparatus as defined in claim 1 wherein spring means are secured between said first and second chuck means to hold gears received about shafts thereon in meshing relation.

8. Apparatus for producing a matched pair of pseudo herringbone gears, including use of first and second helical gears receivable on a first shaft and third and fourth helical gears receivable on a second shaft, the apparatus comprising:
(a) a base;
(b) a first chuck means secured to said base, said chuck means extending upwardly from said base and defining a bore therein for supporting the first shaft in a vertical disposition;
(c) track means received on said base adjacent said first chuck means;
(d) second chuck means received on said track means for movement therealong, said second chuck means extending upwardly from said track means and defining a bore therein for supporting the second shaft therein in a vertical disposition substantially parallel to the first shaft supported in said first chuck means; and
(e) means associated with said chuck means for locating said chuck means at a predetermined spacing therebetween such that the first and second helical gears may be received on the first shaft and the third and fourth helical gears may be received on the second shaft for allowing substantial meshing between the first and third helical gears and between the second and fourth helical gears for producing a matched pair of pseudo herringbone gears.

9. Apparatus as defined in claim 8 wherein said first and second chuck means comprise cylindrical housings, and wherein said first chuck means rotatably supports the first shaft received in said bore of said first chuck means.

10. Apparatus as defined in claim 8 wherein said first chuck means further comprises bearings located along said bore for rotatable support of the first shaft received therein.

11. Apparatus as defined in claim 8 wherein said first and second chuck means further include adjustment means located about said respective bores for securement of a shaft therein.

12. Apparatus as defined in claim 8 wherein said second chuck means is mounted on a member having legs depending therefrom, said legs defining openings therethrough for receipt of said track means.

13. Apparatus as defined in claim 8 wherein said locating means comprise locking means.

14. Apparatus as defined in claim 8 wherein said locating means comprise spring means.

15. A method for producing a pseudo herringbone gear comprising the steps of:
(a) providing first and second opposite angled meshable helical gears whose pin dimensions are within a predetermined deviation from a predetermined theoretical dimension for same;
(b) securing said first helical gear about a first shaft and supporting said shaft in a predetermined disposition;
(c) supporting a second shaft in said predetermined disposition parallel to said first shaft; and securing said second helical gear on said second shaft such that said first and second gears may be brought into meshing engagement;
(d) moving said first and second helical gears into meshing engagement without backlash;
(e) providing third and fourth oppositely angled helical gears having pin dimension within said predetermined deviation of said predetermined theoretical dimension for same and whose combined pin dimension when in mesh without backlash is greater than a like combined pin dimension of said first and second gears, said third helical gear being oppositely angled with respect to said first gear;
(f) securing said third gear about said first shaft juxtaposed to said first gear;
(g) heating said fourth gear to a temperature adequate for heat shrinking said fourth gear onto said second shaft and locating same about said second shaft juxtaposed to said second gear for meshable engagement with said third gear; and
(h) bringing said third and fourth gears into meshing engagement without backlash and maintaining said meshing engagment while said fourth gear cools to ambient temperature.

16. A method as defined in claim 15 including providing helical gears all having pin dimensions within about 0.001 inch deviation from said predetermined theoretical dimension.

17. A method as in claim 15 including providing first and fourth helical gears which are left hand helical gears and second and third gears which are right hand helical gears.

18. A method as defined in claim 15 including providing said first and second shafts in respective chuck means where they are supported in a vertical disposition, and moving one of said chuck means to bring said first and second gears into meshing engagement.

19. A method as defined in claim 15 including heating all of said gears prior to placement of same about their respective shafts for becoming shrink fitted about said shaft upon cooling.

20. A method as defined in claim 15 including heating said fourth gear to a temperature of about 300° F. to about 350° F. prior to placement about said second shaft.

21. A method as defined in claim 15 including providing first and fourth gears which are right hand helical gears and second and third gears which are left hand helical gears.

22. A method for producing a matched pair of pseudo herringbone gears comprising the steps of:
(a) providing first and second oppositely angled helical gears whose individual pin dimensions are within about 0.001 inch of theoretical;
(b) securing said first helical gear about a first shaft and placing said first shaft in a stationary chuck means therefor;

(c) securing said second helical gear about a second shaft and placing said second shaft in a movable chuck means therefor;

(d) moving said movable chuck means with respect to said stationary chuck means to bring said first and second helical gears into meshing relationship without backlash;

(e) providing third and fourth oppositely angled helical gears having individual pin dimensions within about 0.001 inch deviation from a predetermined theoretical dimension, said third and fourth helical gears having a larger combined pin dimension when held in tight meshing engagement than the combined pin dimension of said first and second helical gears as measured when said first and second helical gears are in tight meshing engagement;

(f) securing said third helical gear on said first shaft juxtaposed to said first helical gear to define a space between the teeth of said first and third helical gears;

(g) heating said fourth helical gear to a temperature adequate for shrink fitting about said second shaft and placing said fourth helical gear about said second shaft juxtaposed to said second helical gear to define a space as present between said first and third helical gears on said first shaft;

(h) bringing said third and fourth helical gears into meshing engagement without backlash and permitting said fourth helical gear while said third and fourth helical gears are meshed.

23. A method as defined in claim 21 including rotating said first shaft to bring said third and fourth helical gears into meshing engagement.

24. A method as defined in claim 21 including heating said fourth helical gear to a temperature of about 350° F. prior to placement about said second shaft.

* * * * *